(12) United States Patent
Su et al.

(10) Patent No.: US 7,078,891 B2
(45) Date of Patent: Jul. 18, 2006

(54) SPEEDOMETER GEAR OUTPUT STRUCTURE

(76) Inventors: Kuo-Hsin Su, 3/F., No. 212, Chunghsing Rd., Sec. 3, Hsintien City, Taipei County (TW); Paul Huang, 200 Port Royal Ave., Foster City, CA (US) 94404; Paul Fei-Ta Chen, 1769 Laurentian Wy, Sunnyvale, CA (US) 94087

( * ) Notice: Subject to any disclaimer, the term of this patent is extended or adjusted under 35 U.S.C. 154(b) by 162 days.

(21) Appl. No.: 10/790,101

(22) Filed: Mar. 2, 2004

(65) Prior Publication Data
US 2005/0194965 A1 Sep. 8, 2005

(51) Int. Cl.
*G01P 3/54* (2006.01)

(52) U.S. Cl. .................. 324/174; 73/514.39; 340/441; 116/62.1

(58) Field of Classification Search ............... 324/174, 324/166, 167, 173, 179, 207.2, 207.21, 207.25, 324/207.22; 116/62.1; 240/432, 441; 73/493, 73/514.39; 340/671; 348/448; 180/170
See application file for complete search history.

(56) References Cited

U.S. PATENT DOCUMENTS

| | | | | |
|---|---|---|---|---|
| 2,329,249 A | * | 9/1943 | Carlson | 235/96 |
| 4,504,756 A | * | 3/1985 | Amano et al. | 310/168 |
| 4,510,447 A | * | 4/1985 | Moyer | 324/225 |
| 4,646,042 A | * | 2/1987 | Eshelman | 335/205 |
| 5,264,791 A | * | 11/1993 | Takeda | 324/174 |
| 5,880,585 A | * | 3/1999 | Oguro | 324/174 |

FOREIGN PATENT DOCUMENTS

JP 359160765 A * 9/1984

* cited by examiner

*Primary Examiner*—Bot Leaynh
*Assistant Examiner*—Kenneth J. Whittington
(74) *Attorney, Agent, or Firm*—Rosenberg, Klein & Lee

(57) ABSTRACT

A speedometer gear output structure includes a gearbox installed in a motorcycle and holding a driven gear and an output gear for synchronous rotation with the wheels of the motorcycle, an annular magnetic device fastened to the gear shaft of the output gear for synchronous rotation, and a circuit board mounted in the gearbox and holding a sensor corresponding to peripheral magnetic zones of the annular magnetic device for outputting an output signal indicative of the speed of rotation of the output gear.

13 Claims, 6 Drawing Sheets

SPEEDOMETER GEAR OUTPUT STRUCTURE

BACKGROUND OF THE INVENTION

1. Field of the Invention

The present invention relates to a speedometer for motor vehicle and, more particularly, to a speedometer gear output structure.

2. Description of the Related Art

In a conventional mechanical speedometer driving structure as shown in FIG. 7, the axle 41 of the wheel hub 4 has two lugs 43 axially extended from the end 42, a gearbox 3 is fastened to the front fork of the motorcycle to hold a driven gear 31, and a driving member 33 is coupled to the driven gear 31, and an output gear 32 meshed with the driven gear 31 and coupled to a speedometer cable 34. The driven gear 31 has two opposite flat engagement portions 311 on the periphery. The driving member 33 has two flat engagement portions 331 bilaterally disposed on the inside and respectively engaged with the flat engagement portions 311, and two peripheral lugs 332 outward extended from the periphery at two sides in reversed directions. During rotation of the axle 41 with the wheels of the motorcycle, the lugs 43 of the axle 41 move the lugs 332 of the driving member 33, thereby causing the driving member 33 to rotate the driven gear 31 and then the output gear 32, and therefore the speedometer cable 34 is driven to move the internal mechanism of the speedometer.

This mechanical speedometer driving structure has drawbacks as follows:

1. This design is a mechanical design not suitable for use with an electronic speedometer.

2. The parts of the mechanical speedometer driving structure wear quickly with use and tend to be covered with dust.

3. The mechanical design is not highly precise, unable to indicate the accurate speed of rotation of the motorcycle.

SUMMARY OF THE INVENTION

The present invention has been accomplished under the circumstances in view. It is one object of the present invention to provide a speedometer gear output structure, which is practical for use with an electronic speedometer. It is another object of the present invention to provide a speedometer gear output structure, which is durable in use. It is still another object of the present invention to provide a speedometer gear output structure, which is easy and inexpensive to install. To achieve these and other objects of the present invention, the speedometer gear output structure comprises a gearbox fastened to the front fork of a motorcycle, the gearbox comprising a driven gear rotatable with the wheels of the motorcycle, an output gear meshed with the driven gear, and a receiving chamber corresponding to the output gear, the output gear having a gear shaft; an annular magnetic device mounted on the gear shaft of the output gear for synchronous rotation, the annular magnetic device having at least one magnetic zone; and a circuit board mounted in the receiving chamber of the gearbox, the circuit board comprising a sensor facing the annular magnetic device and adapted to output an output signal indicative of speed of rotation the annular magnetic device and the output gear upon running of the motorcycle, and a signal line extended from the sensor and connected to an electronic speedometer at the motorcycle in which the gearbox is installed for transmitting the output signal of the sensor to the electronic speedometer.

DETAILED DESCRIPTION OF THE PREFERRED EMBODIMENT

Figure 1:
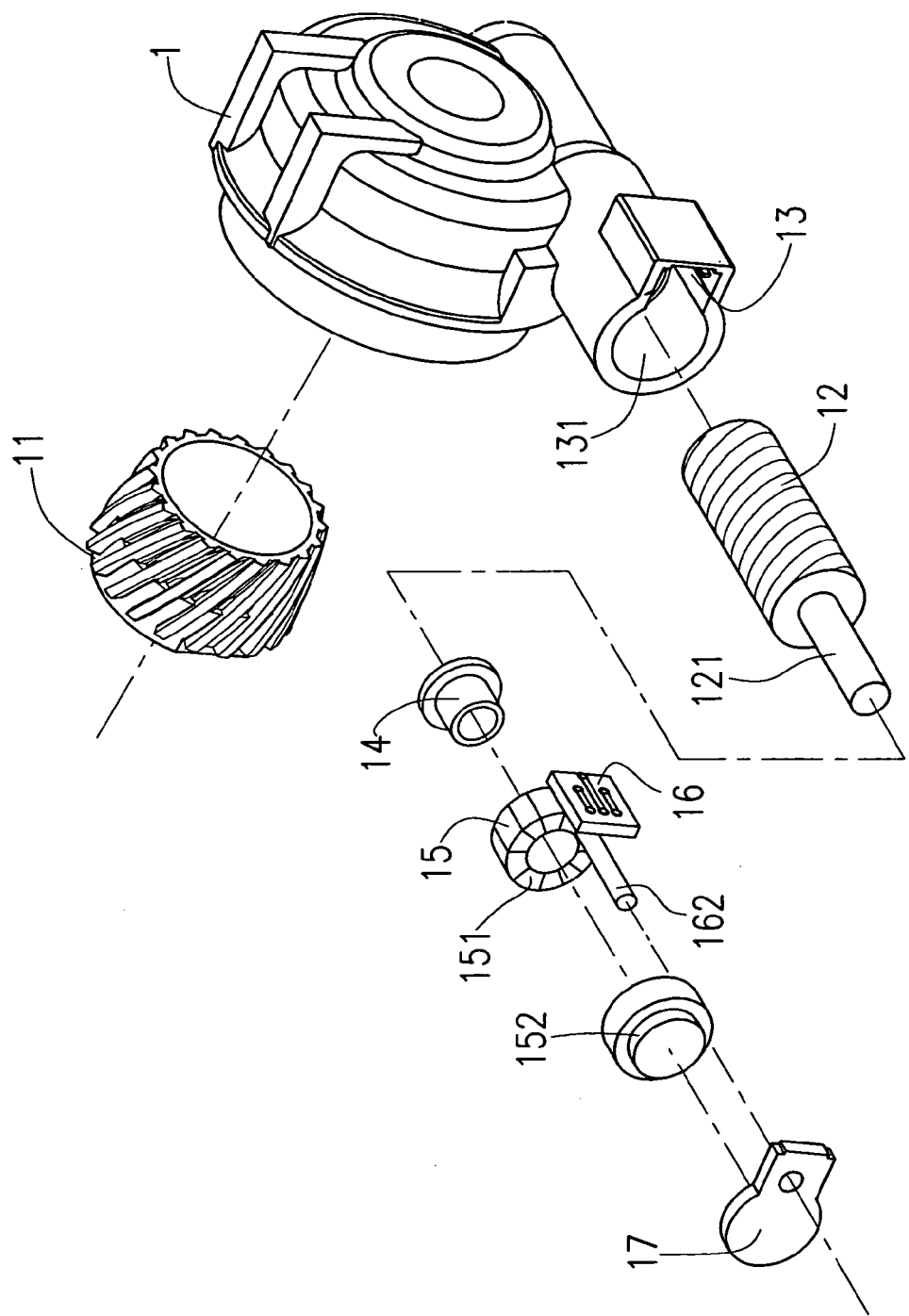
FIG. 1 is an exploded view of a speedometer gear output structure according to a first embodiment of the present invention.
Figure 2:
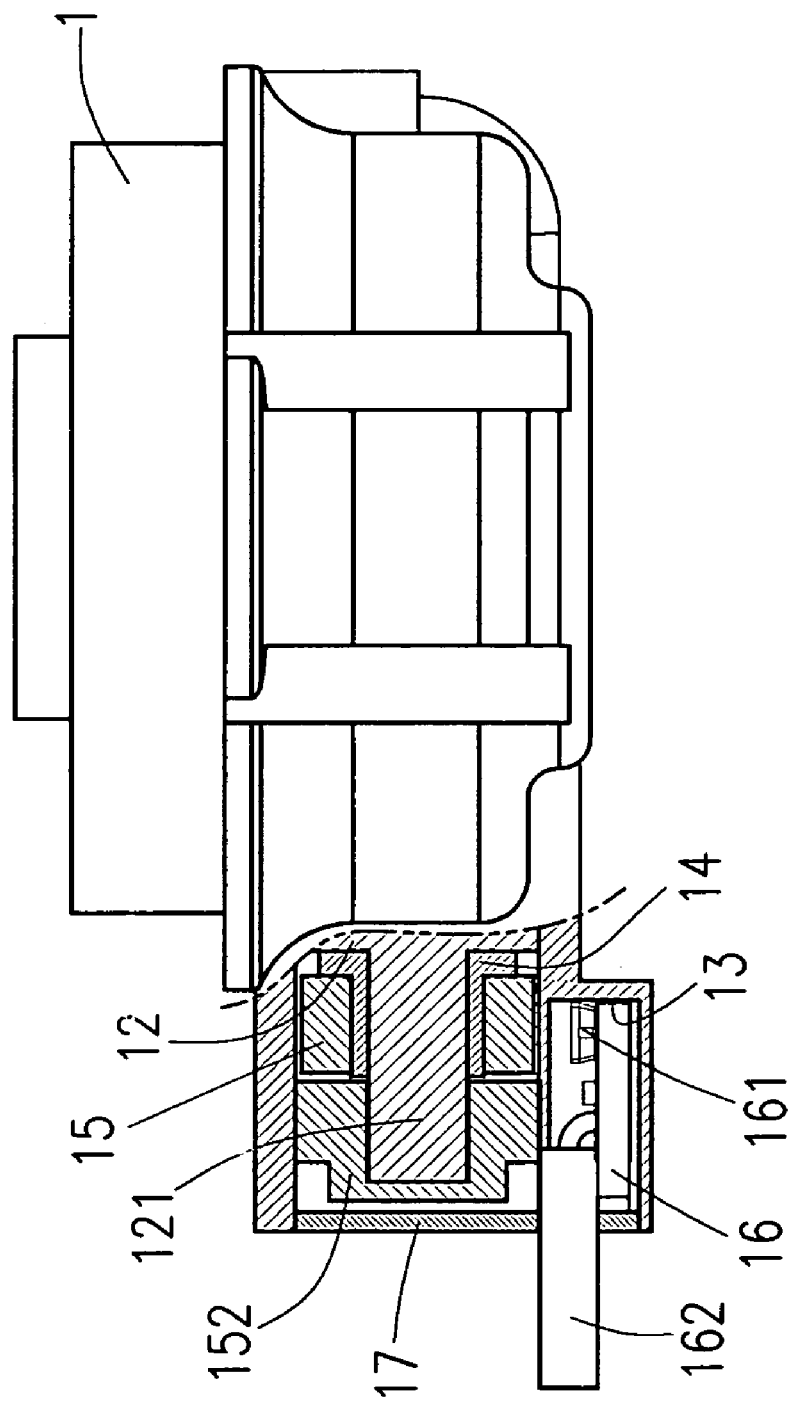
FIG. 2 is a sectional assembly view of a part of the speedometer gear output structure according to the first embodiment of the present invention.
Figure 3:
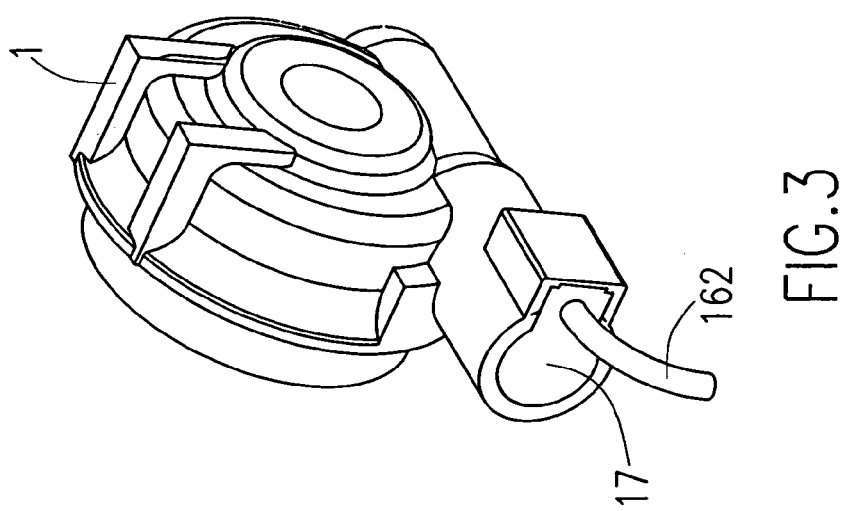
FIG. 3 is an elevational view of the speedometer gear output structure according to the first embodiment of the present invention.

Referring to FIGS. 1~3, a driven gear 11 and an output gear 12 are meshed together in a gearbox 1, which is connectable to the front fork of a motorcycle. An annular magnetic device 15 having radially arranged magnetic zones 151 is receiving chambered on the gear shaft 121 of the output gear 12 for synchronous rotation with the output gear 12. A circuit board 16 is fixedly receiving chambered in a receiving chamber 13 inside the gearbox 1 corresponding to the annular magnetic device 15. The circuit board 16 comprises a sensor 161 facing the periphery of the annular magnetic device 15. The sensor 161 can be a Hall IC or solenoid switch. During running of the motorcycle, the driven gear 11 is driven to rotate the output gear 12 and the annular magnetic device 15, thereby causing the sensor 161 to be induced by the magnetic zones 151 of the annular magnetic device 15 to output to an output signal indicative of the speed of rotation of the annular magnetic device 15 to an electronic speedometer (not shown) through a signal line 162. Further, an axle bush 14 is receiving chambered on the gear shaft 121 of the output gear 12 within the annular magnetic device 15, and an end cap 152 is capped on the gear shaft 121 to lock the annular magnetic device 15 and the axle bush 14 to the output gear 12. Further, a cover plate 17 is fastened to the gearbox 1 to close the mounting hole 131 and receiving chamber 13 of the gearbox 1.

Figure 6:
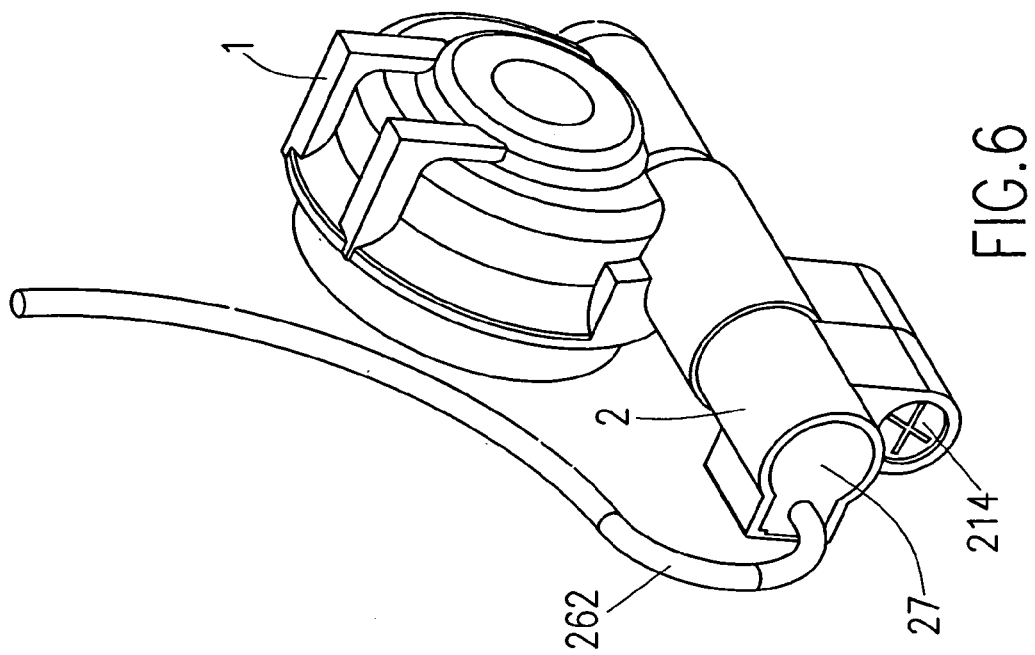
FIG. 6 is an elevational view of the speedometer gear output structure according to the second embodiment of the present invention.
Figure 4:
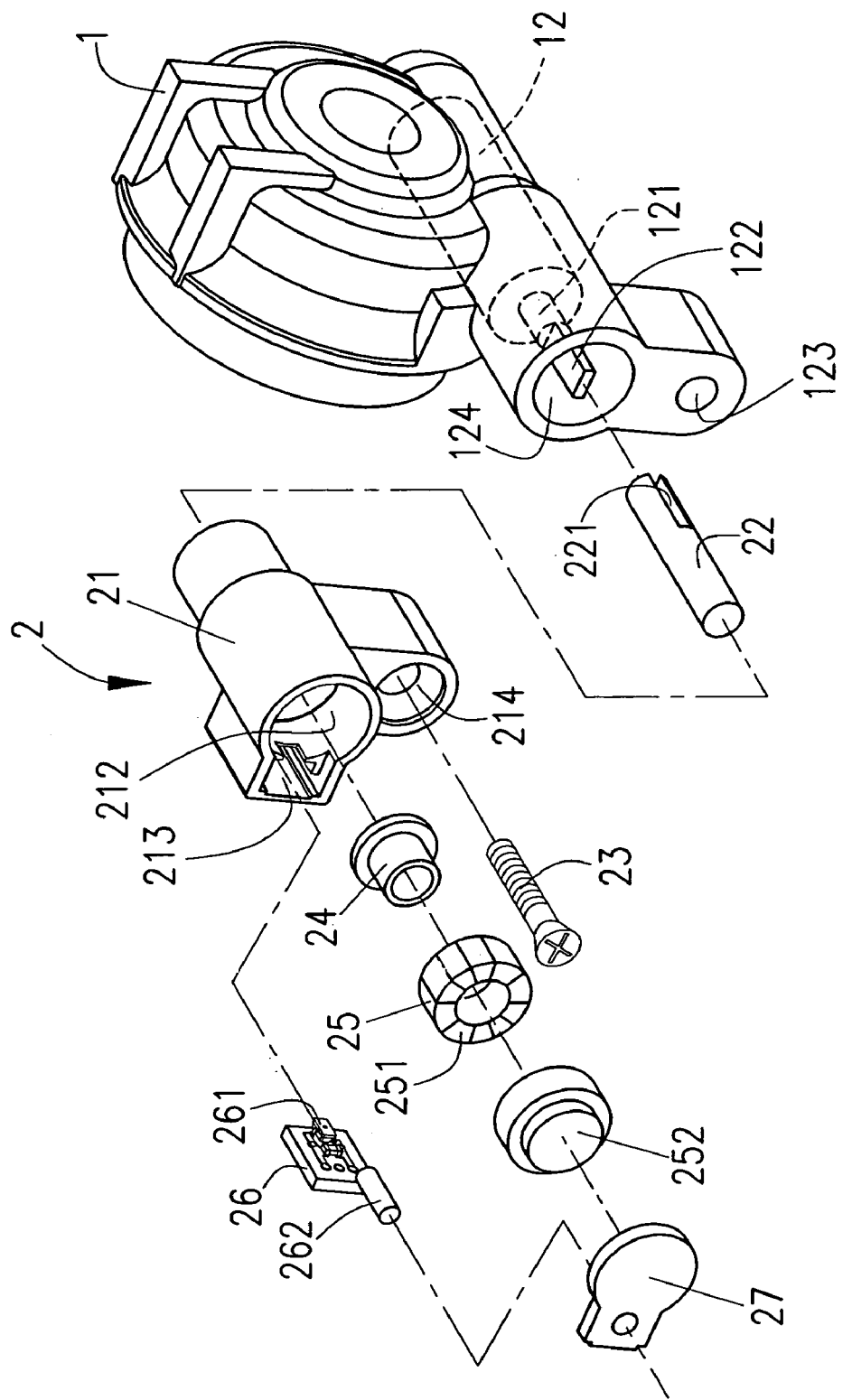
FIG. 4 is an exploded view of a speedometer gear output structure according to a second embodiment of the present invention.
Figure 5:
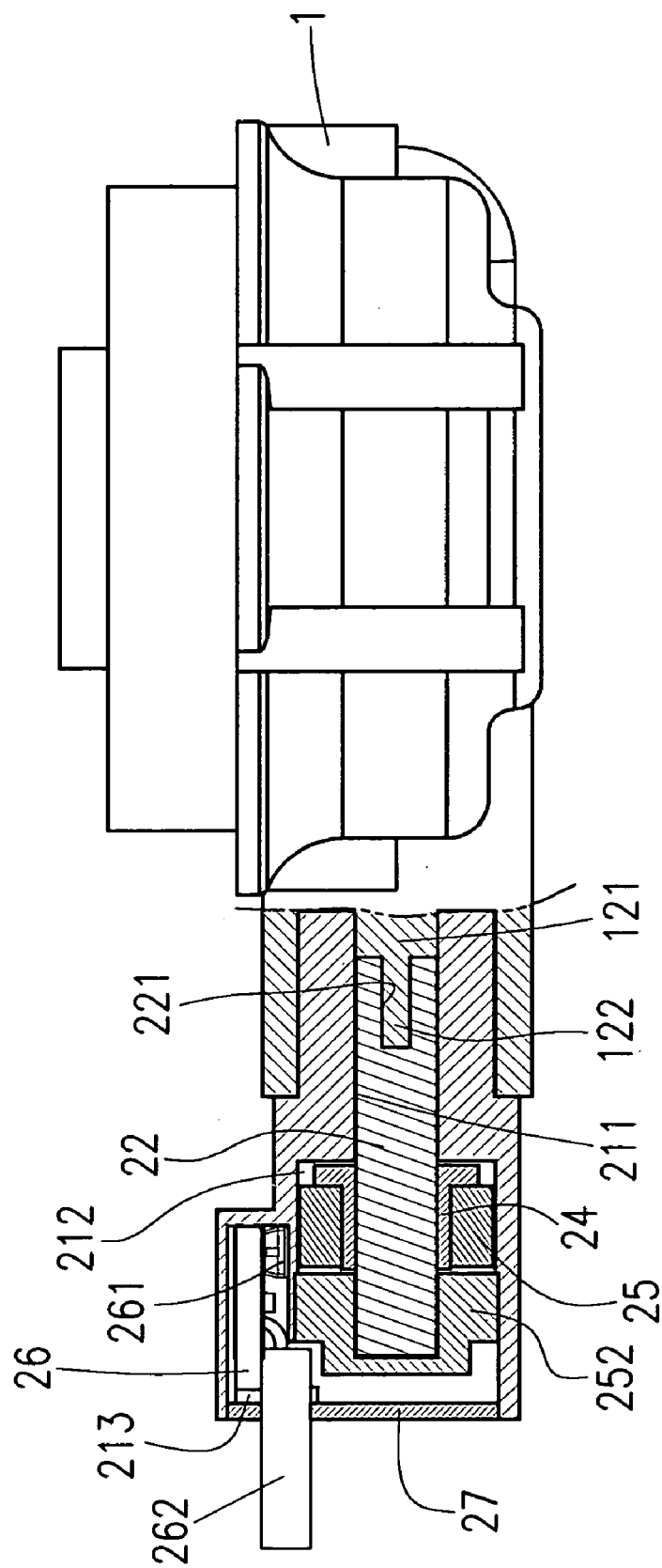
FIG. 5 is a sectional assembly view of a part of the speedometer gear output structure according to the second embodiment of the present invention.
Figure 7:
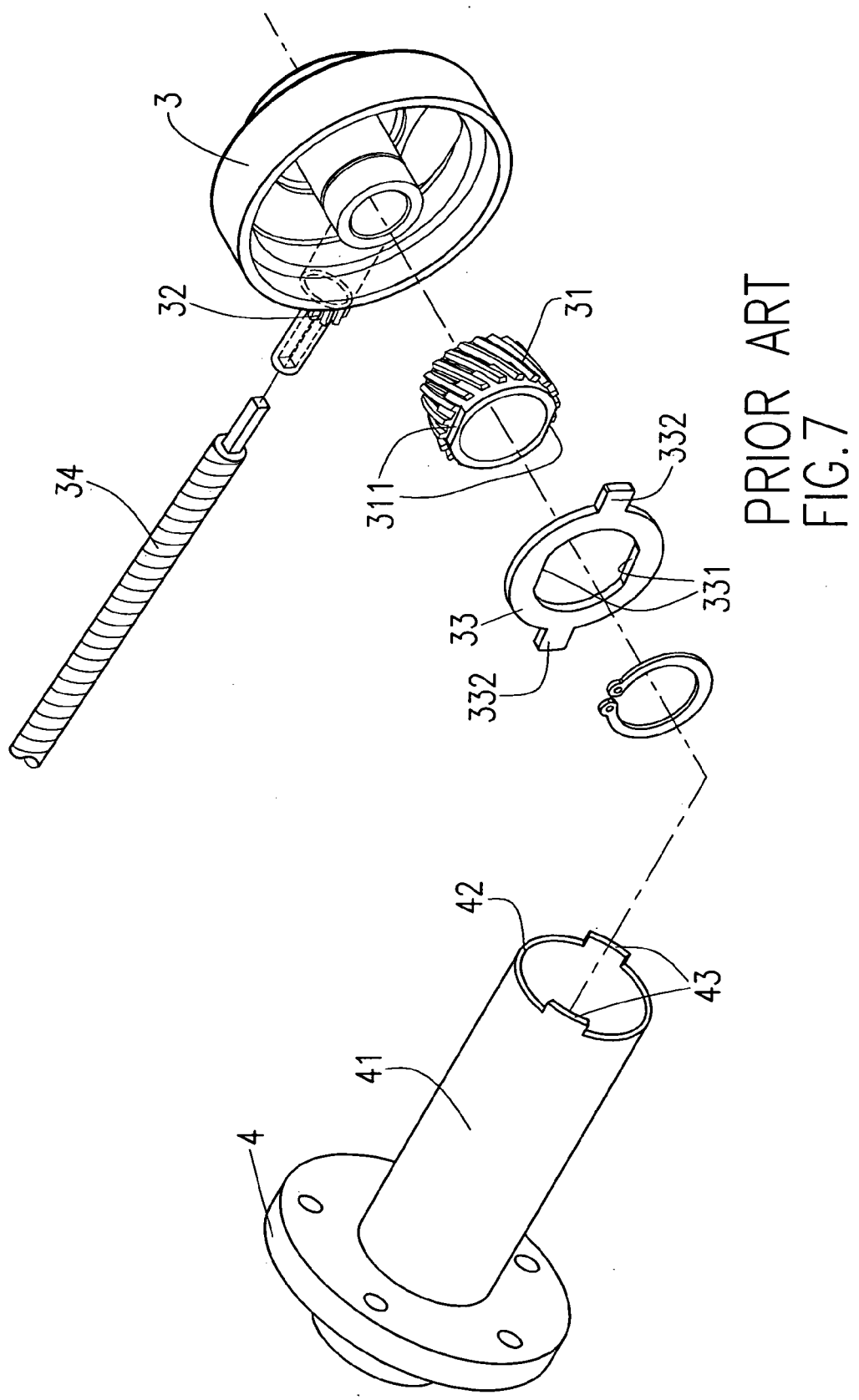
FIG. 7 is an exploded view of a mechanical speedometer driving structure according to the prior art.

FIGS. 4~6 show an alternate form of the present invention. According to this embodiment, the gearbox 1 has an open chamber 124 and a screw hole 123 adjacent to the open chamber 124. The gear shaft 121 of the output gear 12 has a flat coupling end 122 suspended in the open chamber 124. A casing 21 is fastened to the open chamber 124 of the gearbox 1, having a stepped receiving open chamber formed of an inner small diameter portion 211 and an outer big diameter portion 212, a receiving chamber 213 facing the outer great diameter portion 212, and a countersunk hole 214 affixed to the screw hole 123 of the gearbox 1 with a screw 23. A transmission shaft 22 is suspended in the inner small diameter portion 211, having a coupling portion 221 inserted into the open chamber 124 and fastened to the flat coupling end 122 of the output gear 12. An annular magnetic device 25 having radially arranged magnetic zones 151 is receiving chambered on the transmission shaft 22 for synchronous rotation with the output gear 12. A circuit board 26 is receiving chambered in the receiving chamber 213 inside the casing 21, comprising a sensor 261 facing the periphery of the annular magnetic device 25 and a signal line 262 extended from the sensor 261 to the electronic speedometer (not shown). The casing 21, the transmission shaft 22, the annular magnetic device 25 and the circuit board 26 form a sensor unit 2. An axle bush 24 is mounted on the transmission shaft 22 within the annular magnetic device 25. An end cap 252 is capped on the transmission shaft 22 to lock the annular magnetic device 25 and the axle bush 24 to the transmission shaft 22. Further, a cover plate 27 is fastened to the casing 21 to close the receiving chamber 213 facing the outer great diameter portion 212.

During running of the motorcycle, the output gear 12 is driven to rotate the transmission shaft 22 and the annular magnetic device 25 relative to the sensor 261 of the circuit board 26, thereby causing the sensor 261 to be induced by the magnetic zones 251 of the annular magnetic device 25 to output to an output signal indicative of the speed of rotation of the annular magnetic device 25 to the electronic speedometer through the signal line 162.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A speedometer gear output structure comprising:
   a gearbox fastened to the front fork of a motorcycle, said gearbox comprising a driven gear rotatable with the wheels of the motorcycle, an output gear meshed with said driven gear, and a receiving chamber corresponding to said output gear, said output gear having a gear shaft, said receiving chamber having an extended circuit board recess portion extending therefrom;
   an annular magnetic device mounted on the gear shaft of said output gear for synchronous rotation, said annular magnetic device having at least one magnetic zone; and
   a circuit board mounted in the recess portion of said receiving chamber of said gearbox in adjacent relation to said annular magnetic device for directly magnetically coupling said annular magnetic device to said circuit board, said circuit board comprising a sensor facing said annular magnetic device and adapted to output an output signal indicative of speed of rotation of said annular magnetic device and said output gear upon running of the motorcycle, and a signal line extended from said sensor and connected to an electronic speedometer at the motorcycle in which said gearbox is installed for transmitting the output signal of said sensor to the electronic speedometer.

2. The speedometer gear output structure as claimed in claim 1, further comprising an axle bush mounted on said gear shaft of said output gear within said annular magnetic device.

3. The speedometer gear output structure as claimed in claim 1, further comprising an end cap capped on said gear shaft of said output gear to lock said axle bush and said annular magnetic device to said output gear.

4. The speedometer gear output structure as claimed in claim 1, further comprising a cover plate fastened to said gearbox to close said receiving chamber.

5. The speedometer gear output structure as claimed in claim 1, wherein said sensor is a Hall IC.

6. The speedometer gear output structure as claimed in claim 1, wherein said sensor is a solenoid switch.

7. A speedometer gear output structure comprising:
   a gearbox fastened to the front fork of a motorcycle, said gearbox comprising an open chamber, a driven gear rotatable with the wheels of the motorcycle, and a output gear meshed with said driven gear, said output gear having a gear shaft;
   a casing fastened to the open chamber of said gearbox, said casing having a stepped receiving open chamber, and a receiving chamber, said receiving chamber having an extended circuit board recess portion extending therefrom;
   a transmission shaft suspended in the stepped receiving open chamber of said casing and axially connected to said gear shaft of said output gear for synchronous rotation;
   an annular magnetic device mounted on said transmission shaft inside said stepped receiving open chamber of said casing for synchronous rotation with said transmission shaft, said annular magnetic device having at least one magnetic zone; and
   a circuit board mounted in the recess portion of said receiving chamber of said casing in adjacent relation to said annular magnetic device for directly magnetically coupling said annular magnetic device to said circuit board, said circuit board comprising a sensor facing said annular magnetic device and adapted to output an output signal indicative of speed of rotation of said annular magnetic device and said output gear upon running of the motorcycle, and a signal line extended from said sensor and connected to an electronic speedometer at the motorcycle in which said gearbox is installed for transmitting the output signal of said sensor to the electronic speedometer.

8. The speedometer gear output structure as claimed in claim 7, wherein said gearbox comprises a screw hole; said casing comprises a countersunk hole fastened to the screw hole of said gearbox with a screw.

9. The speedometer gear output structure as claimed in claim 7, further comprising an axle bush mounted on said transmission shaft within said annular magnetic device.

10. The speedometer gear output structure as claimed in claim 7, further comprising an end cap capped on said transmission shaft to lock said axle bush and said annular magnetic device to said transmission shaft.

11. The speedometer gear output structure as claimed in claim 7, further comprising a cover plate fastened to said casing to close said receiving chamber and said stepped receiving open chamber of said casing.

12. The speedometer gear output structure as claimed in claim 7, wherein said sensor is a Hall IC.

13. The speedometer gear output structure as claimed in claim 7, wherein said sensor is a solenoid switch.

* * * * *